March 25, 1952     J. G. A. M. J. MEYER ET AL     2,590,440
FLUID MEASURING AND DISPENSING APPARATUS Filed June 14, 1945                         10 Sheets-Sheet 2

Inventors
J. G. A. M. J. Meyer
R. L. Rambert
By
Wenderoth, Lind & Ponack
Attorneys

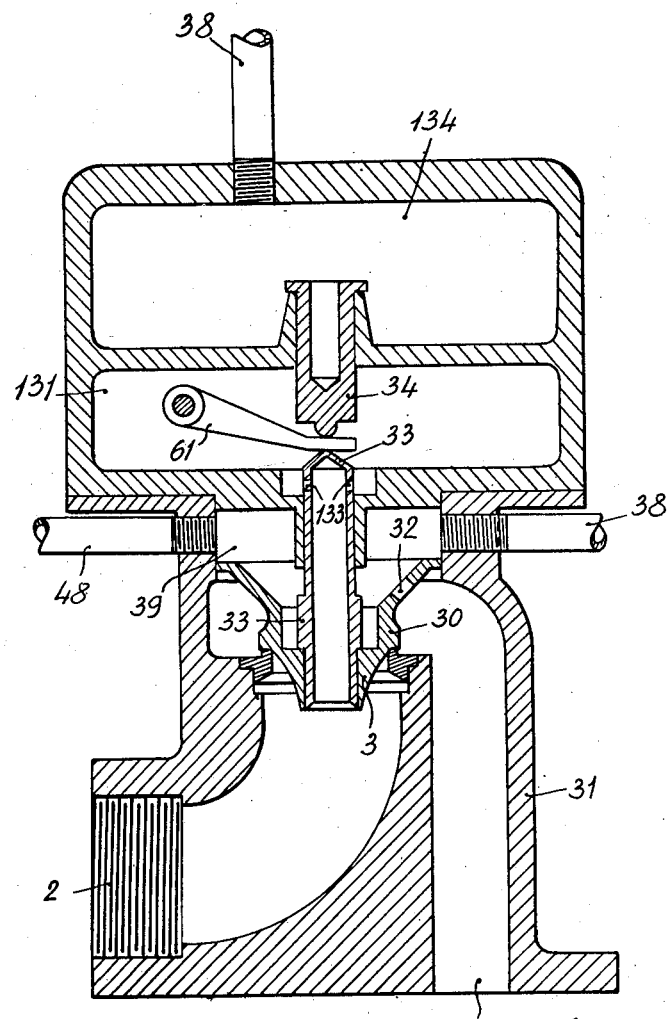

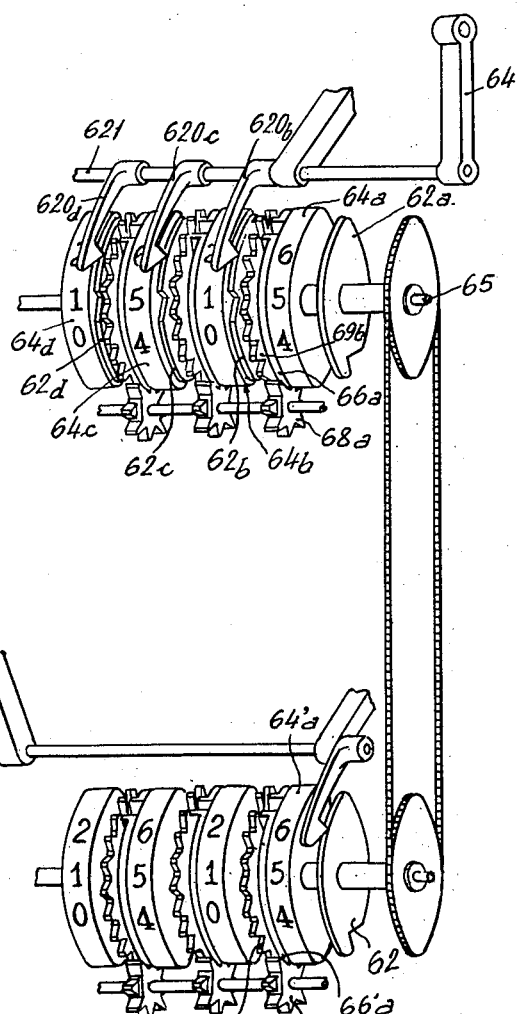

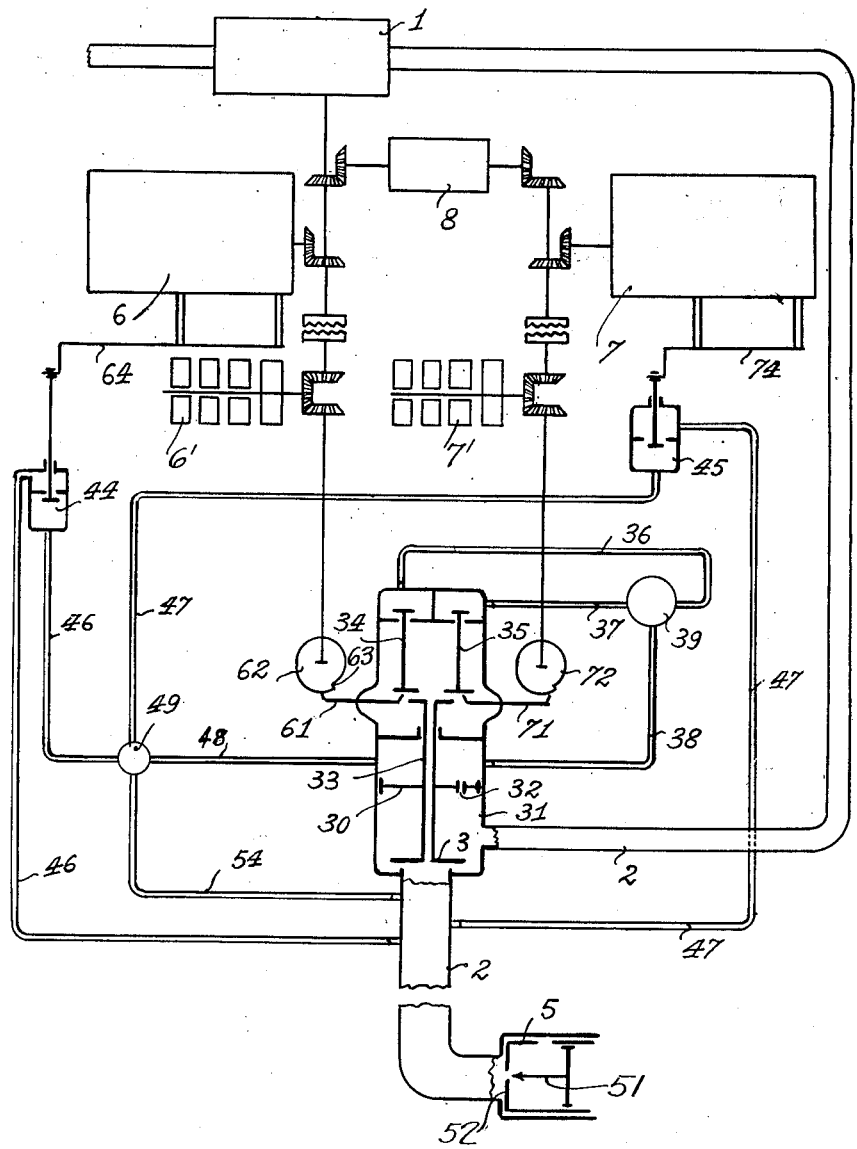

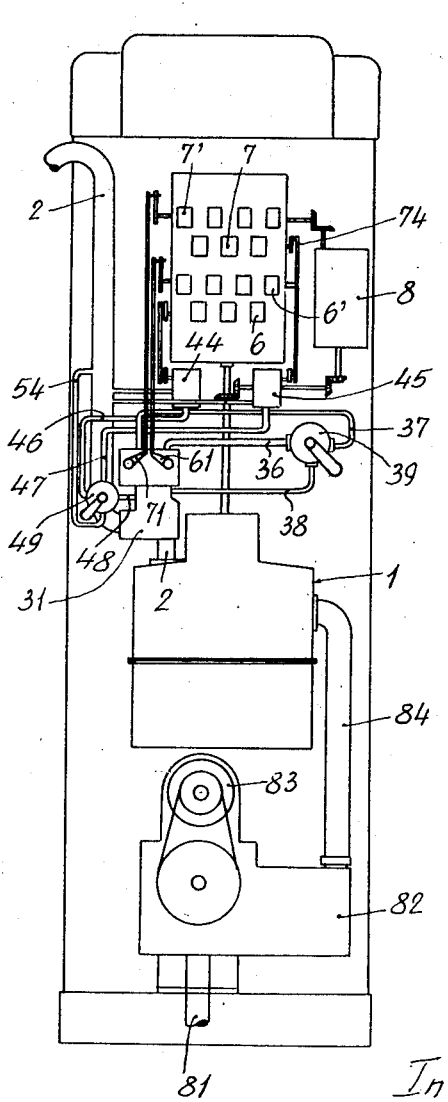

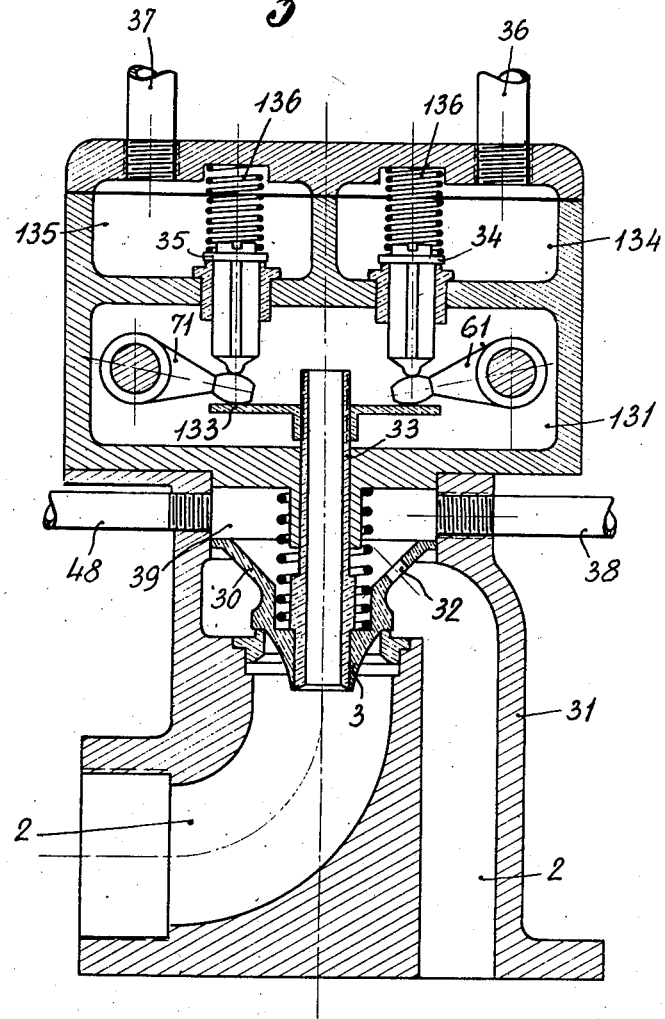

March 25, 1952  J. G. A. M. J. MEYER ET AL  2,590,440
FLUID MEASURING AND DISPENSING APPARATUS
Filed June 14, 1945  10 Sheets-Sheet 8

March 25, 1952     J. G. A. M. J. MEYER ET AL     2,590,440
FLUID MEASURING AND DISPENSING APPARATUS
Filed June 14, 1945     10 Sheets—Sheet 10

Patented Mar. 25, 1952

2,590,440

UNITED STATES PATENT OFFICE 2,590,440

FLUID MEASURING AND DISPENSING APPARATUS

Jean Gustave Antoine Marie Joseph Meyer, Neuilly-sur-Seine, and Raymond Lucien Rambert, Gonesse, France, assignors to the Society S. A. T. A. M. Societe Anonyme Pour Tous Appareillages Mecaniques, La Courneuve, France Application June 14, 1945, Serial No. 599,400
In France October 20, 1943

Section 1, Public Law 690, August 8, 1946
Patent expires October 20, 1963

5 Claims. (Cl. 222—20)

The distribution of a determined amount of a fluid (liquid or gas) by means of a measuring-distributing apparatus, is generally performed in two stages. During the first stage, the apparatus delivers the major part of the fluid to be distributed at normal speed; while during the second stage, the distribution is completed at a sufficiently reduced speed in order that the errors due to the uncertainty as to the exact instant of the stopping of the delivery be without any practical influence upon the amount effectively distributed.

The beginning and the end of the second stage, i. e. of the slowing down period of delivery, may be started in different ways.

In the apparatus with hand control, the operator starts up the beginning and the end of the slowing down. In other types of apparatus, the slowing down is more or less completely subject to the indicating mechanism of the apparatus. Some of said apparatus comprise to that end independently of the usual shutter, a valve which is placed upstream to the latter in the distributing conduit and having its displacements controlled either by the delivery of the liquid, or by the delivery of a by-pass controlled valve which is more or less subject to the indicating mechanism.

In the apparatus of that type having a semi-automatic control, the slowing down is set up by the operator himself by the partial closure of the shutter, thus reducing the delivery and causing the closure of the valve. The stopping of the distribution is set up by the indicating mechanism which owing to the action of a cam called rapid cam, causes the closure of the by-pass controlling valve.

In the apparatus of the said type with entirely automatic control, a predetermining mechanism sets up the beginning of the slowing down by partially closing the by-pass valve, thus causing the closure of the valve, the stopping of the distribution being caused by the complete closure of the said valve through the said mechanism. The partial closure of the valve is generally controlled by the cams called slow cams of the said mechanism and the complete closure by the cam called rapid cam (in some apparatus the said cam is integral with the indicating mechanism).

The object of the present invention is to provide, at will, in a same apparatus, the automatic operation and the semi-automatic operation.

To that end, and according to the present invention, the valve is short circuited by two by-passes, controlled each of them by a valve, the valve of the first by-pass being controlled by the rapid cam of the indicating device as in the semi-automatic apparatus, while the valve of the second one is controlled by the slow cams of the predetermining mechanism.

If the valve being considered is of the type of those which remain closed in the position of rest, it is then necessary when the semi-automatic operation is desired, to cause the opening of the valve.

To this end, and according to the invention, is provided by a third by-pass for short-circuiting the valve, and shutter means enabling to close either the second or the third by-pass according as it is desired to have a semi-automatic or automatic operation.

In this condition, the said third conduit which forms a leakage, enables, as soon the shutter is opened to have an extremely reduced delivery, which is however sufficient for setting in motion the indicating mechanism and, consequently, for causing the opening of the by-pass valve and through it the opening of the valve.

In this case, the delivery of said third conduit is stopped by the end of the distribution. This is obtained either by the complete closure of the shutter or by the automatic closure of the said shutter in the case in which the latter is of the type described in the French patent application P. V. 466,491, filed in the name of the said company, on March 20, 1942, and having for title: "Improvements in the distribution of liquids or gases" and which corresponds to U. S. patent application Serial No. 591,359.

Preferably the second and third by-passes form a single by-pass comprising two branches, of which one comprises the valve controlled by the slow cams of the predetermining mechanism and the shutter means are constituted by a three-way cock arranged at the beginning of the branches and enabling to allow the passage of the fluid by the one or the other of the branches.

If the apparatus comprises two indicating mechanisms and two predetermining mechanisms, on the one hand the first by-pass may also comprise two branches in each of which is arranged a valve, both valves thus provided being each subject to the rapid cam of one of the indicating mechanisms (in general the cam associated with the left hand drum of the indicating mechanism) and a cock enabling to close one of the branches and to open the other, and, on the other hand, the branch of the second by-pass corresponding to the automatic operation may comprise in its turn two sub-branches, each provided with a valve, subject to the slow cams of one of the predetermining mechanisms (in general the cams associated with the drums of the predeterminating mechanisms with the exception of the right hand drum of the latter), a cock enabling to close one of the sub-branches and to open the other.

Preferably, the cock which controls both branches of the second by-pass and the cock which controls the third by-pass may be connected into a single cock, for instance a four-way cock. The said apparatus comprising in the said conditions, a cock into the second by-pass and another one in the first by-pass.

Both cocks may also be joined into a single one, of which the central way is connected to the part of the distributing conduit placed upstream to the valve, while the way of a sub-branch of the second by-pass is provided opposite to the way corresponding to one of branches of the first by-pass and that another way is connected to the part of the distributing conduit placed downstream to the valve, and corresponding to the third by-pass, the body of the said cock being provided with a recess, capable of connecting the central way either with two opposite ways, or with two adjacent ways.

In the apparatus described above, the flow of the fluid during the second distributing stage in the case of the automatic operation, is restrained by the delivery of the first by-pass. The said delivery must however be smaller than DF which is extremely reduced. As a result the first stage of the distribution is practically extremely long.

Such disadvantage may be avoided, by rendering the above-mentioned valve independent from the second by-pass and by providing a second valve upstream to the above mentioned valve in the distributing conduit, the closure and opening of the said second valve being controlled by the valve which is placed in the second by-pass or the valves placed in the branches of the latter, and causing the closure or opening of the first valve, a permanent leakage short-circuiting the second valve.

Preferably, a non return valve prevents the fluid passing by the second by-pass from flowing back towards the downstream valve.

In the case in which the apparatus comprises two predetermining mechanisms and two indicating mechanisms the same arrangements as before may be provided; the by-pass of each valve comprising two branches, upon each of which is arranged a valve and both said valves corresponding to the same valve, being then subject either to the rapid cam of each of the indicating mechanisms, or to the slow cams of the predetermining mechanisms, while a three-way cock or, like device, arranged at the beginning of both branches of each by-pass conduit, enables to neutralize the action of one of the branches.

Preferably, the above mentioned cock, capable of destroying the action of the valve of the downstream valve and the cock arranged in the by-pass of the downstream valve are combined in a single cock having at least four ways.

All the control cocks may also be combined into a single one.

With the above objects in view as well as additional objects which will become apparent from the detailed description below the invention is shown in the drawings in which:

Fig. 1b is a cross section of the box at the valve 31 of Fig. 1.

Fig. 1c is a view of the predetermining mechanism.

Fig. 2 is a view similar to Fig. 1 showing a slightly different form of the invention.

Fig. 2a represents a general view of a distributing apparatus corresponding to the diagram of Fig. 2.

Fig. 2b is a cross section of the box of the valve 31 of Fig. 2 of the application.

Figure 1:
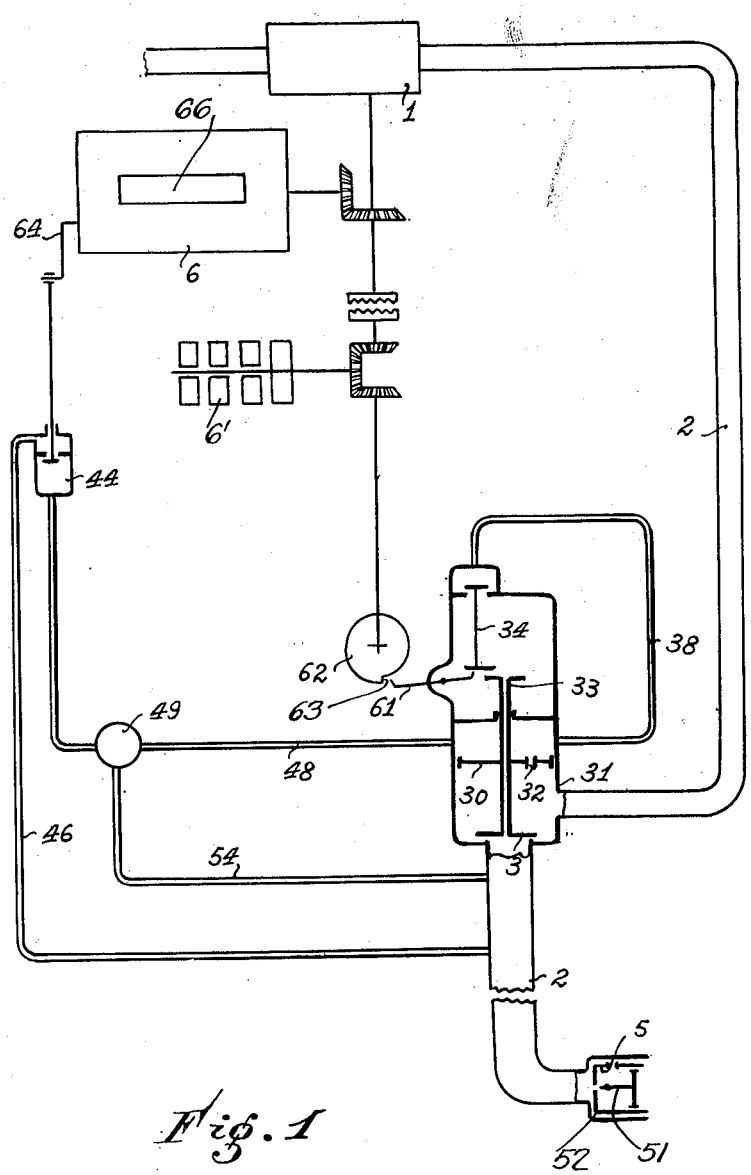
Fig. 1 is a diagrammatic view illustrating the invention.
Figure 1A:
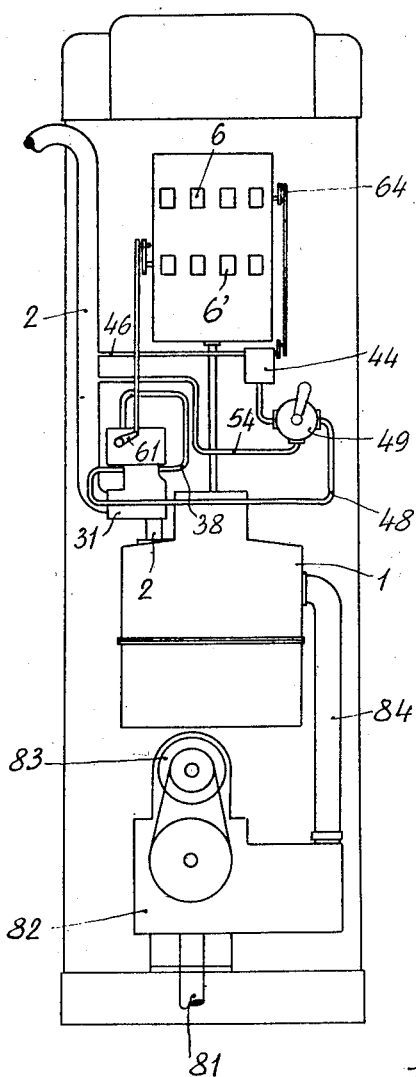
Fig. 1a represents a general view of a distributor corresponding to the showing in Fig. 1.

In the apparatus shown upon Figs. 1, 1a, and 1b the pump 82 actuated by the motor 83 sucks liquid through the conduit 81 and pumps it through the channel 84 into the measuring element 1. The liquid then passes through the channel 2 into the valve box 31 and finally leaves the apparatus when the element 5 is opened which is, for example, of the type described in copending application Ser. No. 591,359 filed May 1, 1949. At the interior of the box 31 there is located a main valve 3 and a piston 30 integral therewith having a larger active surface than that of the valve 3. An opening 32 communicates with the lower face of the piston 30 subjected to the pressure of the liquid in the portion of the channel 2 located above the valve 3 and the upper face of the piston 30 limiting the chamber 39. The valve 3 carries a hollow stem 33 which communicates on one hand with the portion of the channel 2 located downstream of the valve 3 and by the holes 133 with a chamber 131. The valve 3 is by-passed by the following three by-passes:

1. A by-pass, indicated below as by-pass 38, formed by the orifice 32, the chamber 39, a channel 38, chamber 134, chamber 131, holes 133, and the interior of the stem 33 and is controlled by an auxiliary valve 34 whose role will be explained below.

2. A by-pass, denominated below as by-pass 48, 46, formed by the orifice 32, chamber 39, channel 48, and channel 46 and which is controlled by a valve 49 and an auxiliary valve 44 whose roles will be explained below.

3. A by-pass denominated below as by-pass 48, 54, formed by orifice 32, chamber 39 and channels 48 and 54 and which is controlled by the valve 49.

The auxiliary valve 34 is maintained upon its seat by the pressure of the liquid upon its upper face and controls the communication between the chambers 134 and 131. This valve 34 is maintained in its open position by the tail of the stem 33 of the valve 3 when the latter is open. This valve 34 is maintained open by the end of the lever 61 which projects across the chamber 131 and which is controlled by a cam 62. When the lever 61 is located opposite the notch of the cam 62 when the valve 3 is open, the lever 61 can not fall into such notch and the valve 34 is maintained open. However when the valve 3 is closed and the lever 61 can fall into the notch of the cam 62 then the valve 34 can close.

The cam 62 is driven by the measuring element 1 and is connected by a necessary transmission to an indicating mechanism 6'. A rotation of the cam 62 corresponds to a unit of volume registered by the mechanism 6'.

The valve 49 is a three-way valve which allows establishing communication between the channel 48 and either the channel 46 or the channel 54. This valve 49 is operated by the operator.

The valve 44 is controlled through the intermediary of a lever 64 by a predeterminating mechanism 6, itself driven by a measuring element. The valve 44 is closed by the mechanism 6 a little in advance of zero position.

The operation of the diagram shown in Fig. 1 is as follows:

Before any delivery operation, the valve 3, the valves 34, 44 and the shutter 5 are closed.

*Manual operation.*—The conduit 46 is closed by means of the valve 49 which results in opening the third by-pass 48, 54. In order to initiate the dispensing the operator manually opens the valve 5. The flow is then carried out through the construction at a very slow speed through the third by-pass 48, 54. This flow causes a rotation of the measurer 1, of the mechanism 6 and the cam 62. The lever 61 leaving the notch 63 causes the opening of the valve 34. The flow is then carried out not only through the third bypass 48, 54 but also through the first by-pass 32, 38, 33. The pressure upon the upper face of the piston 30 diminishes. The liquid located upstream of the valve 3 exercises, upon the lower face of the piston 30 and upon the valve 3, forces whose resultant tends to open the latter and finally surpasses the opposing force exercised by the liquid upon the upper face of the piston 30 which causes the opening of the valve 3. In this position the valve 34 is maintained open by the stem 33 and can not come into its closing position when the notch 63 passes in front of the lever 61. Dispensing is then carried out at normal speed. When the operator judges that the quantity of liquid actually dispensed is close to that which is to be dispensed he manually closes the large valve 52 of the obturator 5, the flow in the first bypass 32, 38, 33 diminishes, the force exercised by the liquid upon the upper face of the piston 30 increases until it exceeds the resultant of the forces exercised by the liquid upon the lower face of the piston 30 and upon the valve 3 which causes the closing of the valve 3. When the operator decides, upon reading the indications of the mechanism 6 appearing in back of the window 66, that the quantity of liquid actually dispensed is equal to that which it is desired to dispense he manually closes the small valve 51 of the obturator 5 which completely stops dispensing.

*Semi-automatic operation.*—The branch 46 is also closed by means of the cock 49. In such conditions, the starting and the first stage of the distribution take place as before. When the operator believes that the amount of liquid effectively distributed is very close to that which must be distributed, he closes the large valve of the shutter 5, as above. The dispensing continues under the same conditions as in the hand operation until the instant at which the lever 61 falling into the notch of the cam 62, causes the closure of the by-pass 38. The delivery then takes place only through the branch 54 at a lower speed than that which causes automatically the closure of the small valve of the shutter 5.

*Automatic operation.*—The third by-pass 48, 54 is closed by means of the valve 49 which opens the second by-pass 48, 46. The mechanism 6 is set at the quantity of liquid to be dispensed and the obturator 5 is opened permanently. This setting results in opening the valve 44. The dispensing can then take place through bypass 48, 46. The rotation of the cam 62 which results in this dispensing then causes as set forth above the opening of the valve 34. Dispensing then takes place through the first bypass 32, 38, 33 and the second bypass 48, 46. The flow in the by-pass 32, 38, 33 becomes sufficient as explained above for opening the valve 3.

Dispensing takes place at normal speed through the conduit 2 and the two by-passes 32, 38, 33 and 48, 46. Slightly before the mechanism 6 returns to zero, the lever 64 causes the closing of the valve 44 and the valve 51.

Dispensing continues however to be carried out at reduced speed through by-pass 32, 38, 33 up to the moment when it is itself closed in its turn when the lever 61 falls into the notch of the cam 62. Dispensing is then terminated.

In the apparatus shown upon Figs. 2, 2a and 2b, the pump 82 actuated by the motor 83 sucks liquid through the conduit 81 and forces it through the channel 84 into the measuring element 1.

The liquid then passes through the channel 2 into the valve box 31 and finally leaves at the exterior when the pipe 5 is opened, for example of the type described in copending application Ser. No. 591,359 filed May 1, 1945. At the interior of the box 31 there is located a main valve 3 and a piston 30 integral therewith having an active surface larger than that of the valve 3. An orifice 32 communicates with the lower face of the piston 30 which is subjected to the pressure of the liquid in the portion of the channel 2 located upstream of the valve 3 and the upper face of the piston 30 limiting the chamber 39. The valve 3 carries a hollow stem 33 which allows the portion of the channel 2 located downstream of the valve 3 to communicate with a chamber 131. The valve 3 is by-passed by the three following by-passes.

1. A by-pass, denominated below as by-pass 38, formed by the opening 32, chamber 39, channel 38, channel 36 or 37, chamber 134, or 135, chamber 131 and the interior of the stem 33. A three-way valve 39 permits needling the liquid arriving by 38 into the channel 36 or 37. The communications between the chambers 134 and 135 and the chamber 131 are controlled by auxiliary valves 34 or 35 whose role will be explained below.

2. A by-pass, mentioned below as 48, 46 or 48, 47, formed by opening 32, chamber 39, channel 48 and channel 46 or 47. This by-pass is controlled by a valve 49 and the auxiliary valves 44 and 45 whose roles will be explained below.

3. A by-pass, mentioned below as by-pass 48, 54 formed by opening 32, chamber 39, and the channels 48 or 54 and controlled by the valve 49.

The auxiliary valve 34 is maintained upon its seat by the pressure of the liquid upon its upper face and by a spring 136 and controls the communication between the chambers 134 and 131. This valve 34 is maintained in open position by a plate 133 carried by the stem 33 of the valve 3 when the latter is open. This valve 34 is maintained open by the end of a lever 61 which projects out of the box 31 and which is controlled by cam 62. When the lever 61 is located opposite the notch of the cam 62 or when the valve 3 is open, the lever 61 can not fall into such notch and the valve 34 is maintained open. When the valve 3 is closed, the lever 61 can fall into the notch of the cam 62 and the valve 34 can be closed.

The valve 35 whose role for the channel 37 and the chamber 135 is identical with that of the valve 34 for the channel 36 and the chamber 134 coacts with the plate 133 and a lever 71. The latter is controlled by a cam 72.

The cams 62 and 72 are driven by the measuring element 1 and are connected by the necessary transmissions respectively of the indicating mechanisms 6' and 7'. A rotation of the cam 62 or 72 corresponds to a unit of volume registered by the mechanism 6' or 7'.

The valve 49 is a multi-way valve which allows establishing communication between the channel 48 and either the channel 46 or the channel 47 or the channel 54. The valve 49 is operated by the operator.

The valves 44 and 45 are controlled through the levers 64 and 74 of the predeterminating mechanisms 6 and 7 themselves driven by the measuring element. The valves 44 and 45 are closed by said mechanisms 6 and 7 a little before they arrive into the zero position.

The predetermining mechanism is shown upon Fig. 1c.

In this latter figure the predeterminating mechanism 6 is formed with four drums 64a, 64b, 64c, and 64d, the drum of the lower order 64a being fixed to the shaft 65, while the other drums are mounted loosely upon such shaft. The rotation of the drum 64a is transmitted to the drum 64b by a transfer device formed of a driving cam 66a, fixed to the drum 64a, a gear 68a and a toothed wheel 69b fixed to the drum 64b of such a type that for each ten units registered by the drum 64a the drum 64b advances one unit. Similar transfer devices are provided between the drums 64b, 64c, and 64c, 64d. Furthermore each drum has fixed thereto a cam 62a, 62b, 62c, 62d.

The cams 62b, 62c, 62d are called slow cams because they rotate less rapidly than the cam 62a, fixed to the right hand drum 64a, coacting with a comb formed of three levers 620b, 620c, 620d and a shaft 621 carried by the frame of the apparatus and carrying the lever 64 which controls the valve 44.

The indicator mechanism 6' is similar to the predeterminating mechanism 6 except that the cams 62a, 62b, 62c, 62d are eliminated and that only the drum of lower order 64'a is fixed to the cam 62 which act through the intermediary of the lever 61 upon the valve 34.

The operation of the mechanism shown in Fig. 2 is similar to the preceding one. Notwithstanding the diagram furthermore enables in the case of entirely automatic operation, to cause for instance the slowing down by means of the mechanism 6 and the stopping by means of the other mechanism 7. In this case it will only be necessary to bring the cock 49 in the position which corresponds to that connecting the by-pass 48 with the sub-branch 46 and the cock 39 in such a position that the by-pass 38 is connected to the branch 37.

In this way it is possible, for instance, to avoid that small change be given back to the customer asking for an amount of liquid counted in volume units, by first delivering at normal speed an amount of volume substantially equal to the number of volume units requested, then at slowed down speed the additional liquid necessary in order that the price of the total amount of liquid effectively delivered be a multiple of the money unit chosen for the mechanism 7, which is closest by excess of the price corresponding to the amount of liquid requested by the customer.

Figure 3:
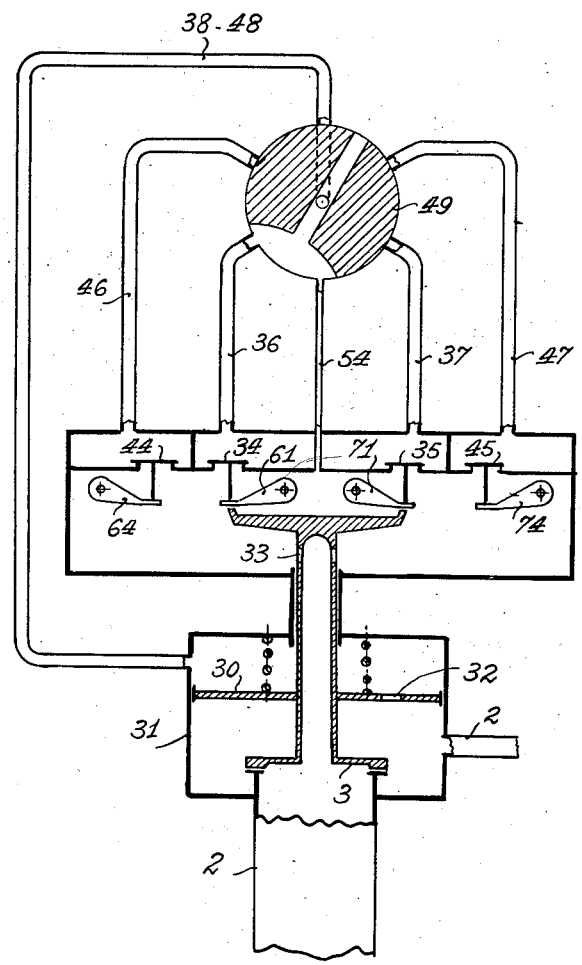
Fig. 3 is a diagrammatic view with portions in section showing a modified construction.

The diagram shown in Fig. 3 is similar to the diagram shown in Fig. 2, but for the following differences:

(a) The cocks 39 and 40 of the preceding diagram are combined into a single cock 49;

(b) The by-passes 38 and 48 are common and lead into the central way of the cock 49;

(c) One of the sub-branches 46 or 47 of the by-pass 48 leads in front of one of the branches 36 or 37 of the by-pass 38;

(d) The body of the cock 49 is provided with a recess enabling to connect the central way 38, 48, either with two of the adjacent lateral ways, or with two opposite ways.

The said diagram enables with a single cock 49 to obtain all the possibilities of operation of the diagram shown in Fig. 2.

Figure 4:
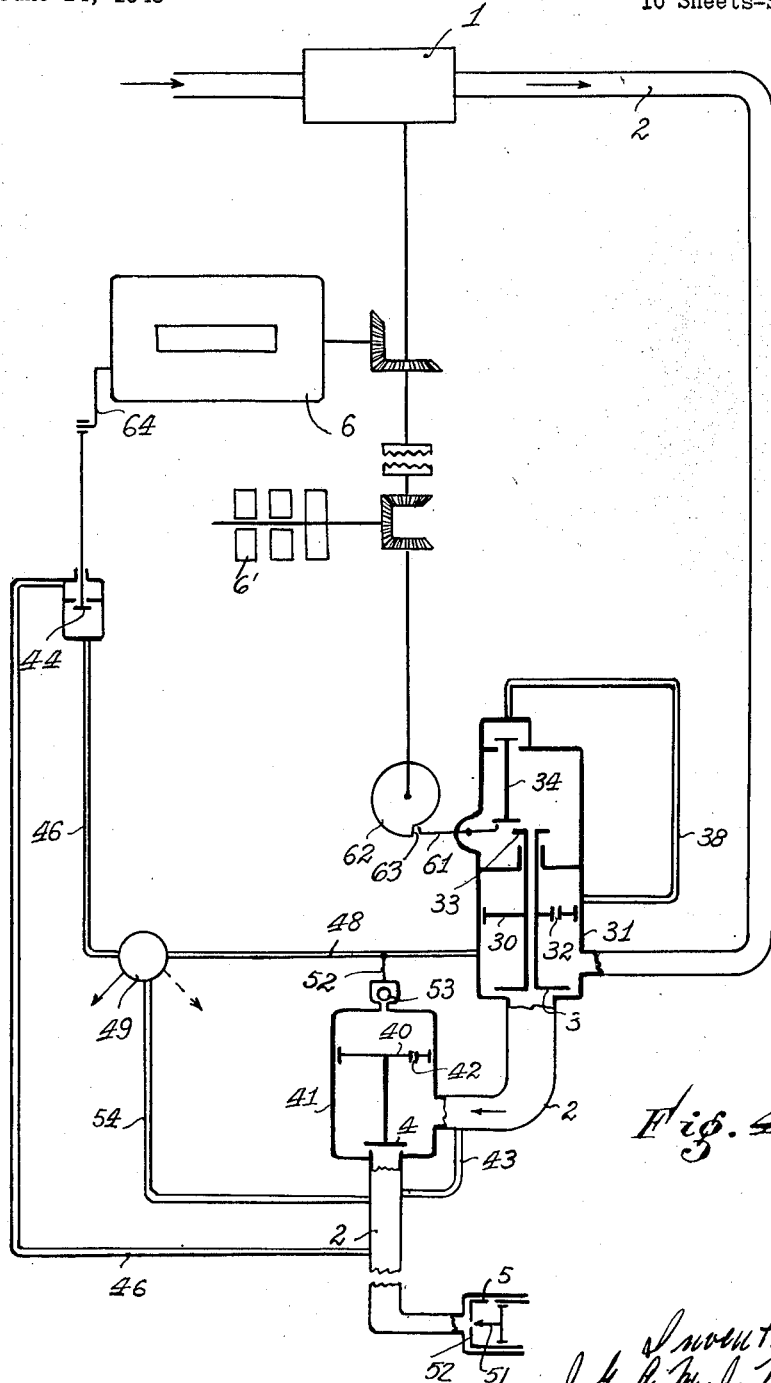
Fig. 4 is a view similar to that shown in Fig. 1 but differing therefrom in various particulars.

The diagram shown in Fig. 4 is different from that shown in Fig. 1.

(a) By the addition of a second valve 4 which is placed in the conduit 2 downstream to the valve 3 and comprises, as the valve 3, a piston 40 integral with it, a gauged aperture 42 connecting both faces of the piston 40, the assembly being arranged within a casing 41.

(b) By the fact that the by-pass 48 leads upstream to the piston 30 and to the valve 3.

(c) By the connection of the valve 4 and of the leakage 48 through a conduit 52.

(d) By the presence in said conduit 52 of a non return valve 53, preventing a return of the liquid of the leakage 48 in the casing 41, containing the valve 4 and its piston 46.

(e) By the presence of a permanent leakage 43 short-circuiting the valve 4.

The operation of the said apparatus may be explained as follows:

Before the beginning of a delivery, the valves 3 and 4 and the valves 34 and 44 and the shutter 5 are closed.

*Manual operation.*—The valve 49 is brought into such a position that the by-pass 48 communicates with the conduit 54. In order to start dispensing, the operator opens the obturator 5. Under these conditions the flow takes place through the conduits 48 and 54 forming the third by-pass at slow speed. This flow is without action upon the valve 3 since the conduit 48, 54 opens out into the box 31 upstream of the piston 30. This flow is also without action upon the valve 4 since the one way valve 53 opposes any action upon the upper face of the piston 40. But this flow causes a rotation of the measurer 1, of the mechanism 6 and the cam 62. The lever 61 leaving the notch 63 opens the valve 34. Liquid flows through the by-pass 32, 38, 33 and the valve 3 opens. The liquid which crosses the latter passes then partly through the escape 43, partly through the hole 42 and the conduits 52, 48, 54 while raising the valve 53. The valve 4 also opens and dispensing is carried out at normal speed. From the fact that in Fig. 4 the by-pass 32, 38, 33 can itself bring about alone the opening of the valve 3 this by-pass is able to dispense more than the by-pass 32, 38, 33 of Fig. 1 and from the fact that the by-pass 48, 54 of Fig. 4 is without influence upon the opening of the valves 3 and 4 it is possible to give to such by-pass 48, 54 larger dimensions than that of the bypass 48, 54 of Fig. 1. Thus the period preceding the opening of the valves 3 and 4 in Fig. 4 is shorter than the period preceding the opening of the valve 3 in the apparatus shown upon Fig. 1.

In order to stop the delivery, the operator can, by a first movement (for instance when the indicator shows him that the amount effectively delivered is close to that to be delivered) close by hand the large valve of the shutter 5, thus causing a slowing down of the delivery and, consequently the closure of the valves 3 and 4, the action of the liquid upon the pistons 30 and 40 being insufficient for maintaining the valves open as is known. The delivery is however continuing through the conduits 52, 48, 54 and by the by-pass 38. When the operator believes that the amount effectively delivered is equal to the amount he wants to deliver, he closes by hand the small valve of the said shutter 5, thus stopping the delivery.

*Semi-automatic operation.*—The cock 49 is maintained in the position mentioned above. Consequently, the starting of the delivery is performed in the same conditions as before. In the same way, the operation of the apparatus is similar during the distribution.

For stopping the delivery, the operator, as in the preceding modification, closes the large valve of the shutter 5 and thus causes the slowing down of the delivery, which continues to proceed in the same conditions as before until the instant at which the lever 61 falls into the notch of the cam 62. The valve 64 is then closed and the distribution continues to proceed at an extremely reduced speed through the conduits 52, 48 and 54. In such conditions, the small valve of the shutter 5 is almost immediately automatically closed.

In the apparatus described above the flow of fluid at starting is very small in the semiautomatic operation since it is limited by the flow in the first by-pass.

*Entirely automatic operation.*—The mechanism 6 is set upon the amount to be delivered, the cock 49 is brought in such a position that the by-pass 48 is connected with the branch 46 and the shutter 5 is maintained permanently open. The starting of the delivery is performed as before but that the liquid flows through the conduits 52, 48 and 46, the valve 44 being open for setting the amount to be delivered upon the mechanism 6. The delivery is performed as before. For stopping the delivery, the operator has no manipulation to perform. In fact, the fall of the teeth of the rake 64 into the notches of the slow cams of the mechanism 6 causes the closure of the valve 44 and, consequently, the closure of the valves 4 and 3, a little before that the effectively delivered amount of liquid be equal to the amount set on the mechanism 6. The delivery is then slowed down and continues to take place through the by-pass 38 and the leakage 43. The fall of the lever 61 into the notch of the cam 62 causes the closure of the valve 34 and consequently the complete stopping of the delivery.

Figure 5:
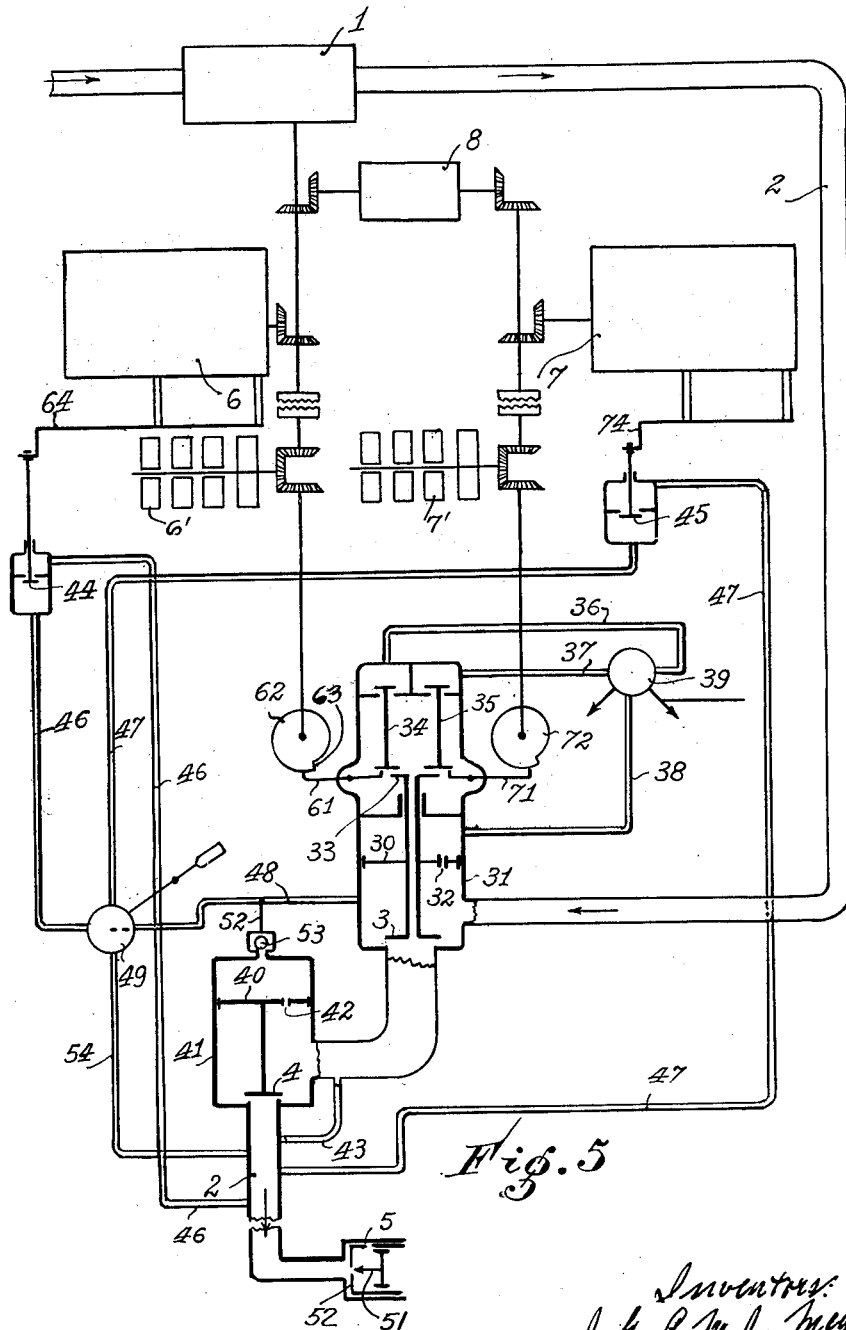
Fig. 5 is a further diagrammatic view illustrating a further modification of the invention.

The diagram shown in Fig. 5 is different from that of Fig. 4 on account of modifications such as those which distinguish the diagram shown in Fig. 2 from that shown in Fig. 1.

The operation of the diagram, shown in Fig. 5 is similar to the preceding one and may particularly be performed according to the three different methods described above. However the said apparatus enables furthermore in the case of the entirely automatic operation, to perform all the operations allowed by the diagram shown in Fig. 2 and that cannot be performed with the diagram shown in Fig. 1.

The present invention is not limited to the diagrams shown. Thus for instance, in the diagram of Fig. 1, without departing from the scope of the invention, the conduit 54 and the cock 49 could be suppressed, since they become without object. In this case, the diagram thus simplified enables the automatic operation since nothing is changed. It enables the semi-automatic operation only provided that the predetermining mechanism 6 be set upon an amount which is higher than the amount to be delivered. In such conditions, the valve 44 is open during all the distribution and the conduit 46 accomplishes the same purpose as the conduit 54 in the diagram shown in Fig. 1.

We claim:

1. A measuring and dispensing apparatus for fluids comprising a main dispensing conduit, a measuring element, a main valve capable of closing said conduit, three by-passes bypassing said valve, a first auxiliary valve capable of closing the first of said by-passes, means operated by said measuring element in order to maintain said first auxiliary valve open in all positions except one, means for maintaining said first auxiliary valve open controlled by the position of the main valve, a second auxiliary valve capable of closing the second of said by-passes, a predeterminating mechanism operated by said measuring element, means operated by said predeterminating mechanism in order to close the second auxiliary valve, means controlled by the operator for closing either said third by-pass or said second by-pass, a piston of a larger cross section than that of the main valve integral with said main valve, one of the faces of said piston being subjected to the action of the pressure prevailing above the main valve, which action tends to open the latter while the other face is subjected to the action of the pressure of the fluid at a point of the said by-passes located upon the above said auxiliary valve of the first by-pass, the action of the pressure upon this latter face tending to close the main valve and bring about the closure of the latter when the flow from the by-passes falls below a maximum value and the opening of said valve when the flow from said by-passes is above such maximum value a closing valve placed upon the main dispensing conduit below the main valve controlled by the operator and capable of closing partially said main conduit and to reduce in such position the flow in the by-passes below the above said maximum value which will bring about the closing of the main valve.

2. A measuring and dispensing apparatus for fluids comprising a main dispensing conduit, a measuring element, a main valve capable of closing said conduit, two branches bypassing said valve, a first auxiliary valve capable of closing the first of said branches, means operated by said measuring element for maintaining said first auxiliary valve open in all of its positions except one, means for maintaining the first auxiliary valve open controlled by the position of the main valve, a second auxiliary valve capable of closing the second of said branches, a predeterminating mechanism operated by said measuring element, means operated by said predeterminating mechanism in order to close the second auxiliary valve, a by-pass means controlled by the operator for closing either said by-pass or the second branch, a closing valve placed upon said main dispensing conduit below said main valve controlled by the operator and capable of closing partially or completely the main dispensing conduit, an element coacting with said main valve subjected at one of its sides to the pressure of the fluid in said branches, the dimensions and the locations of the active faces of said main valve and said element being such that said main valve closes automatically when the pressure in the branches goes below a value which corresponds to the partial closing of the closing valve.

3. An apparatus according to claim 1 comprising a second main valve located upon the dispensing conduit below said first main valve, the second by-pass by-passing the two main valves.

4. An apparatus according to claim 1 comprising a second main valve located upon the dispensing conduit, below said first main valve, a third by-pass by-passing the two main valves, means controlled by the operator for closing one of the second and third by-passes and opening the other of the second and third by-passes, the second by-pass bypassing the two main valves.

5. A measuring and dispensing apparatus for fluids comprising a main dispensing conduit, a measuring element, a main valve capable of closing said conduit, three by-passes by-passing said main valve, the first and second by-passes each having two branches, a first and second auxiliary valve capable of closing respectively the two branches of the first by-pass, means operated by said measuring element in order to maintain the said auxiliary valves open in all positions except one, means for maintaining said auxiliary valves open controlled by the position of the main valve, third and fourth auxiliary valves capable of closing respectively the two branches of the second by-pass, two predeterminating mechanisms operated by said measuring element, means operated by said predeterminating mechanisms in order to close respectively the third and fourth auxiliary valves, means controlled by the operator for closing either said third by-pass or one of the branches of the second by-pass, a piston of larger cross section than that of the main valve integral with said main valve, one of the faces of said piston being subjected to the action of the pressure prevailing above the main valve, which action tends to open the latter while the other face is subjected to the action of the pressure of the fluid in an elected one of said by-passes, the action of the pressure upon this latter face tending to close the main valve and bring about the closure of the latter when the flow from the by-passes falls below a maximum value and the opening of said valve when the flow from said by-passes is above such maximum value and a closing valve placed upon the main dispensing conduit below the main valve controlled by the operator and capable of closing partially said main conduit and to reduce in such position the flow in the by-passes below the above said maximum value which will bring about the closing of the main valve.

JEAN GUSTAVE ANTOINE MARIE
JOSEPH MEYER.
RAYMOND LUCIEN RAMBERT.

REFERENCES CITED

The following references are of record in the file of this patent:

UNITED STATES PATENTS

| Number | Name | Date |
|---|---|---|
| 2,161,920 | Fraser | June 13, 1939 |
| 2,302,201 | Fraser | Nov. 17, 1942 |
| 2,305,221 | Mangan | Dec. 15, 1942 |
| 2,336,383 | Alexander | Dec. 7, 1943 |
| 2,358,712 | Hinds | Sept. 19, 1944 |